United States Patent
Pare, Jr.

(10) Patent No.: US 8,040,970 B2
(45) Date of Patent: Oct. 18, 2011

(54) METHOD AND APPARATUS FOR ADAPTIVE REDUCED OVERHEAD TRANSMIT BEAMFORMING FOR WIRELESS COMMUNICATION SYSTEMS

(75) Inventor: Thomas Edward Pare, Jr., Mountain View, CA (US)

(73) Assignee: Ralink Technology Corporation, Jhubei (TW)

( * ) Notice: Subject to any disclaimer, the term of this patent is extended or adjusted under 35 U.S.C. 154(b) by 845 days.

(21) Appl. No.: 11/949,706

(22) Filed: Dec. 3, 2007

(65) Prior Publication Data

US 2009/0046768 A1   Feb. 19, 2009

Related U.S. Application Data

(63) Continuation-in-part of application No. 11/840,897, filed on Aug. 17, 2007.

(51) Int. Cl.
    H04L 27/00 (2006.01)
(52) U.S. Cl. .................. 375/295; 375/219; 375/222
(58) Field of Classification Search .......... 375/219, 375/220, 295, 222
    See application file for complete search history.

(56) References Cited

U.S. PATENT DOCUMENTS

2007/0064830 A1* 3/2007 Choi et al. ............ 375/267
2007/0127588 A1* 6/2007 Kim .................... 375/267

OTHER PUBLICATIONS

Hidehiro Matsuoka, Hideo Kasami, Makoto Tsurata, and Hiroki Shoki, A Smart antenna with pre-and post-FFT hybrid domain beamforming for broadband OFDM system, IEEE 2006.*

Draft Standard for Information Technology—Telecommunications and Information Exchange Between Systems—Local and Metropolitan Area Networks-Specific Requirements, IEEE 802.11n Draft 2.0, Feb. 2007.
"On Channel Estimation in OFDM Systems," Edfors, Ove et al., VTC96, 1995, pp. 1-5, Conference Paper.
"Simplified Channel Estimation for OFDM Systems with Multiple Transmit Antennae," Li Ye, IEEE Transactions on Wireless Communications, vol. 1, No. 1, pp. 67-75, Jan. 2002.
"Digital Communication Receivers," Meyr, Heinrich et al., pp. 505-530, 1998, John Wiley and Sons, Inc., New York, NY USA.

* cited by examiner

Primary Examiner — Dac Ha
Assistant Examiner — Tanmay Shah
(74) Attorney, Agent, or Firm — Maryam Imam; IPxLAW Group LLP

(57) ABSTRACT

A multi input multi output (MIMO) transceiver having a channel estimation module being responsive to received samples including channel state information (CSI) and operative to generate time domain beamforming parameters, in accordance with an embodiment of the present invention. The multi input multi output (MIMO) transceiver further includes an adaptive beamforming parameters module coupled to receive said time domain beamforming parameters and operative to generate time domain adaptive beamforming parameters, said adaptive beamforming parameters module operative to process said time domain beamforming parameters to generate frequency domain adaptive beamforming parameters, a decoding module coupled to receive said frequency domain adaptive beamforming parameters and operative to generate data bits, a channel parameters module coupled to receive said data bits and operative to extract said time domain adaptive beamforming parameters, an encoding module coupled to receive said time domain adaptive beamforming parameters and operative to generate a data packet, said encoding module operative to encode said data packet to generate a modulated data stream, and a beamform matrices module coupled to receive said modulated data stream and operative to generate a beamformed data stream based on said frequency domain adaptive beamforming parameters, said MIMO transceiver operative to process said beamformed data stream to generate output signals and to transmit said output signals by forming beam patterns.

18 Claims, 8 Drawing Sheets

Feedback overhead reduction benefits.

Comparison of overhead for different feedback techniques
(3X3 MIMO channel)

| Method | Overhead formula | Total Bits | Reduction (%) |
|---|---|---|---|
| 1. Full CSI | $3 + 2N_b N_r N_c N_{sc}$ | 8232 | 0 |
| 2. Steering matrix | $2N_b N_r N_c N_{sc}$ | 8064 | 3 |
| 3. Compressed Feedback | $6N_b N_{sc}$ | 2688 | 67 |
| 4. Present Invention (Full CSI) | $2 \times 9 N_b N_L$ | $N_L = 8 : 1152$ | 86 |
| | | $N_L = 16 : 2304$ | 72 |
| | | $N_L = 24 : 3456$ | 58 |

Table 1

FIG. 9

METHOD AND APPARATUS FOR ADAPTIVE REDUCED OVERHEAD TRANSMIT BEAMFORMING FOR WIRELESS COMMUNICATION SYSTEMS

CROSS REFERENCE TO PRIOR APPLICATIONS

This application is a continuation-in-part application of my previous U.S. patent application Ser. No. 11/840,897, filed on Aug. 17, 2007, and entitled "METHOD AND APPARATUS FOR CALIBRATION FOR BEAMFORMING OF MULTI-INPUT-MULTI-OUTPUT (MIMO) ORTHOGONOL FREQUENCY DIVISION MULTIPLEXING (OFDM) TRANSCEIVERS", the disclosure of which is incorporated herein by reference as though set forth in full.

BACKGROUND OF THE INVENTION

1. Field of the Invention

The present invention relates generally to the field of wireless communication systems and particularly to a method and apparatus for adaptive transmit beamforming with reduced overhead in multi input multi output (MIMO) communication systems.

2. Description of the Prior Art

Communication systems can be categorized as conforming to either wired or wireless standards. Implementations can range from local wireless networks in the home, to the national and international cell phone networks, to the worldwide Internet.

Each communication system deployed typically conforms to one or more of a number of existing standards. Wireless standards include the IEEE 802.11 wireless local area network (WLAN), the advanced mobile phone services (AMPS), Bluetooth, global system for mobile communications (GSM), code division multiple access (CDMA), local multi-point distribution system (LMDS), multi-channel-multi-point distribution systems (MMDS), and various proprietary implementations of such standards.

Wireless devices in a network, such as a laptop computer, personal digital assistant, video projector, or WLAN phone, can communicate either directly or indirectly to other users or devices on the network. In direct communication systems, often referred to as point-to-point communication systems, the two devices are assigned one or more communication radio frequency (RF) channels, and the devices communicate directly over those channels. In indirect communication systems, the devices communicate through an intermediary device, such as an associated base station for cellular services, or an access point for home or office WLAN networking, on an assigned channel. To complete the connection, the access point or base station communicates with the pair directly, using the system controller, the Public switch telephone network (PSTN), the Internet, or some other wide area network.

Referring now to FIG. 1, a conventional WLAN home network is shown to include an access point (AP) or base station 200, a network interface hardware 204 and various electronic devices 206-214 that are used in a typical WLAN home network. The devices include a WiFi phone 206, a personal digital assistant (PDA)/WiFi camera 208, a laptop 210, a home audio system 212 and a high definition television (HDTV)/projector 214. The devices 206-214 communicate with each other through the AP 200 on assigned channels. The AP 200 has a beamforming capable transmission module 216 and a multi input multi output (MIMO) antenna 218. Each of the devices 206-214 also has a beamforming capable transmission module and an MIMO antenna. The AP 200 is connected to the Internet Wide area network (WAN) or LAN through the network interface hardware 204.

The commonly known architecture for a digital wireless device to receive data in one of these networks includes an antenna connected to an RF signal processing circuit. The antenna receives the RF signal and supplies it to the RF circuit, which filters out unwanted signal and noise from adjacent channels and in turn converts it to the baseband (i.e., centered at zero frequency, DC), or some intermediate frequency (IF). The analog RF output signal, at IF or baseband is converted to a digital stream and processed by the baseband module. The baseband module demodulates and decodes the baseband signal, thus recovering the original data.

Similarly, to send data over the network, the digital baseband encodes the bit stream, modulates the encoded stream, and if necessary converts it to an IF signal. The digital signal is converted to an analog signal using a digital to analog converter and sent to the RF circuit. The RF circuit converts the analog baseband output to an RF signal, using a carrier frequency corresponding to the channel assigned to the particular user, and sends the signal over the wireless channel using the RF antenna.

Traditional devices, particularly early (pre-2005) WLAN products adhering to the 802.11 standard, have used a single physical RF antenna, for both transmitting and receiving data. The antenna is shared by virtue of time-domain duplexing (TDD), whereby the transceiver only transmits or receives data at any given time, and does not do both simultaneously. Thus the antenna can be shared between the receiver and transmitter functions. When only one antenna is used at each end of the communication link, the channel established is referred to as a single-input/single-output channel, or SISO. More advanced systems based on this standard employ multiple antennae, for both receiving and transmitting data. A basic two-antenna device that switches between antennae automatically based on received signal quality is using antenna-switching diversity. If the two-antenna device transmits on both antennae simultaneously, the channel is referred to as multiple-input/single-output (MISO), if the receiver side of the link only has one receiver antenna. Conversely, if the transmitter uses a single antenna, and the receiver uses two antennae, the channel is called a SIMO (single-input/multiple-output) channel.

Currently entering the market are MIMO products (multiple-input/multiple-output) devices, aimed at very high performance in throughput, range and link reliability. These products are in advance of the published standard, as the Institute of Electrical and Electronic Engineers (IEEE) has only recently completed Draft 2.0 of the 802.11n standard that formalizes the operation of multiple antennae WLAN systems. In particular, the standard defines the protocols and techniques that enable multiple antenna systems to interoperate so that maximum beamforming benefits can be achieved. For example, systems with multiple antennae can transmit and receive more than one data stream simultaneously using a combination of either time or spatial encoding functions. This can effectively double or triple the throughput, depending on the number of parallel streams.

To improve signal reception quality, the Draft 2.0 standard also includes several beamforming modes of operation. Basically, beamforming is a technique where an array of antennae are "directed" at a desired target or source by adjusting the relative gain and phase of the array elements. By adjusting the relative gain and phase of the elements, the antenna pattern, or beam, can be made to point in a favored direction for receiving or transmitting data, or to attenuate other directions in order to reduce an interference source. Prior art publications describing these methods are: A Primer on Digital Beamforming by Toby Haynes, Spectrum Signal Processing 1998, Digital beamforming basics, by Hans Steyskal, Journal of Electronic Defense 1986. The foregoing references describe the basic mathematics associated with forming beam patterns in order to focus an antenna array to better receive or transmit RF signals.

In the 802.11n Draft 2.0 standard, there are several methods of beamforming detailed that pertain to the orthogonal frequency domain multiplexing (OFDM) type of modulation. The OFDM modulation is multi-carrier, utilizing the inverse fast Fourier transform (IFFT) process to convert N individual data symbols into a time-domain signal for transmission. At the receiver, the time domain signal is blocked up into symbols and demodulated back into a vector N individual frequency domain symbols. The received signal y on each subcarrier can be expressed as y=Hx+n, and x=Qs, where s is the sent symbol, Q is a pre-multiplier, H is the channel between the transmitter and receiver, and n is the effective noise. For an MIMO link, the channel H is a matrix. For example, in a two transmitter and three receiver (2T3R) system, the H matrix is 3×2, and the received signal equation can be written as:

$$\begin{bmatrix} y_1 \\ y_2 \\ y_3 \end{bmatrix} = \begin{bmatrix} h_{11} & h_{12} \\ h_{21} & h_{22} \\ h_{31} & h_{32} \end{bmatrix} \begin{bmatrix} x_1 \\ x_2 \end{bmatrix} + \begin{bmatrix} n_1 \\ n_2 \\ n_3 \end{bmatrix},$$

and the sent signal is expressed as:

$$\begin{bmatrix} x_1 \\ x_2 \end{bmatrix} = \begin{bmatrix} q_{11} & q_{12} \\ q_{21} & q_{22} \end{bmatrix} \begin{bmatrix} s_1 \\ s_2 \end{bmatrix}.$$

During the course of decoding the received data, the channel matrix H is estimated, using the preamble portion of the data packet. To implement one particular form of beamforming, the channel state information (CSI) based on H is processed by the receiver and sent back to the transmitter. The transmitter then formulates a beamforming matrix Q, based on the CSI, and uses Q to beamform subsequent packets to the corresponding receiver. This process, by which the CSI is sent back to the transmitter for beamforming, is referred to as explicit beamforming.

Explicit beamforming is one method described in the 802.11n standard. There are three associated feedback formats for the CSI information. The first implementation utilizes a scaled version of the H matrix, and is referred to as full CSI. The data required to send the full CSI as feedback can be prohibitive because much dynamic range is required to represent a channel that has any significant fading. To alleviate this, another method referred to a steering matrix feedback is implemented. In this case the channel matrix is first decomposed using the singular value decomposition (SVD), so that $$H = U\Sigma V^*$$ Eq. (1)

After the decomposition, the V matrix is sent back to the transmitter. The advantage is that the V matrix is unitary (all its columns have unity norm), so that less resolution is needed to represent the channel, and thus there is reduced overhead with the method. The problem with this method is that small variations in the channel condition could lead to large changes to the V matrix. Thus, this method may not be robust and suffers from sudden performance loss in both throughput and link stability.

To further reduce the amount of information required for beamforming feedback, a third protocol is spelled out in the standard that compresses the channel state information. This is accomplished using Givens rotation decomposition and polar coordinates to parameterize the steering matrix, and feeding this back to the transmitter instead. Prior art limitations include feeding back an incomplete CSI to the transmitter; thereby limiting the type of beamforming processing that can be used, and, because it relies on the V matrix, it too may be sensitive to channel variations, as mentioned with the compressed method discussed above.

Thus, there exists a need to provide a method and apparatus for explicit feedback transmit beamforming that allows full and accurate CSI that requires a low amount of overhead to implement.

SUMMARY OF THE INVENTION

Briefly, an embodiment of the present invention includes a multi input multi output (MIMO) transceiver having a channel estimation module being responsive to received samples including channel state information (CSI) and operative to generate time domain beamforming parameters. The multi input multi output (MIMO) transceiver further includes an adaptive beamforming parameters module coupled to receive said time domain beamforming parameters and operative to generate time domain adaptive beamforming parameters, said adaptive beamforming parameters module operative to process said time domain beamforming parameters to generate frequency domain adaptive beamforming parameters, a decoding module coupled to receive said frequency domain adaptive beamforming parameters and operative to generate data bits, a channel parameters module coupled to receive said data bits and operative to extract said time domain adaptive beamforming parameters, an encoding module coupled to receive said time domain adaptive beamforming parameters and operative to generate a data packet, said encoding module operative to encode said data packet to generate a modulated data stream, and a beamform matrices module coupled to receive said modulated data stream and operative to generate a beamformed data stream based on said frequency domain adaptive beamforming parameters, said MIMO transceiver operative to process said beamformed data stream to generate output signals and to transmit said output signals by forming beam patterns.

The foregoing and other objects, features and advantages of the present invention will be apparent from the following detailed description of the preferred embodiments which make reference to several figures of the drawing.

IN THE DRAWINGS

FIG. 1 shows a conventional WLAN home network including an access point (AP) or base station 200, a network interface hardware 204 and various electronic devices 206-214 that are used in a typical WLAN home network.

Figure 5:
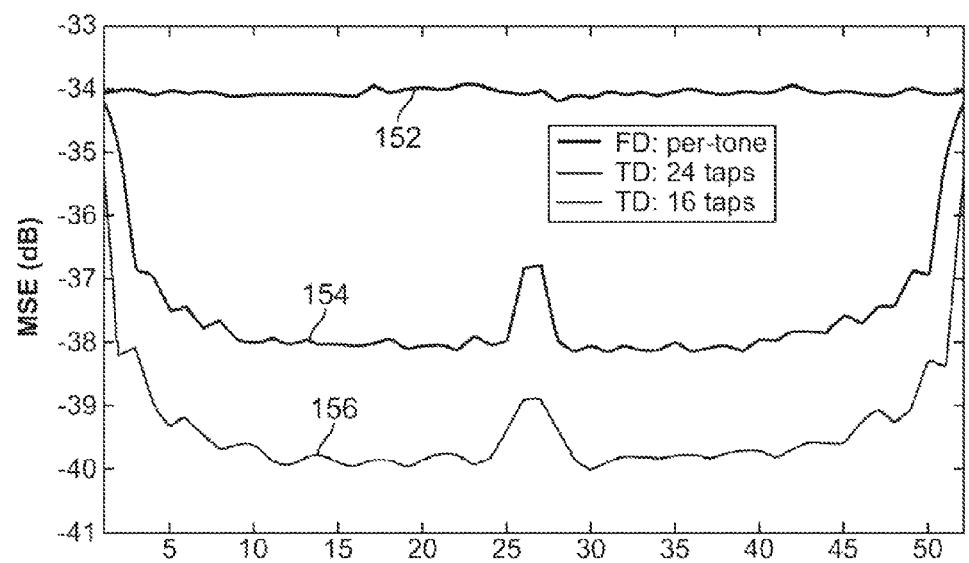

FIG. 5 shows a frequency domain estimator 152, a 24-tap time domain estimation 154 and a 16-tap time domain estimation 156 of mean-square error (MSE) for each subcarrier, in accordance with an embodiment of the present invention.

Figure 6:
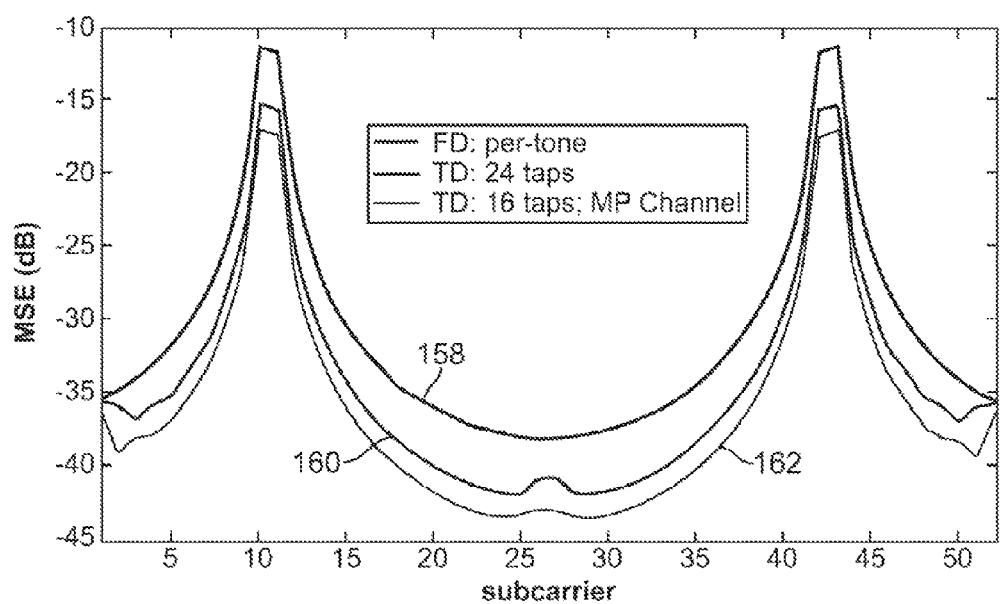

FIG. 6 shows the estimation of MSE of a faded channel with g=(1 0.1 1) that has two deep nulls in-band, in accordance with an embodiment of the present invention.

Figure 7:
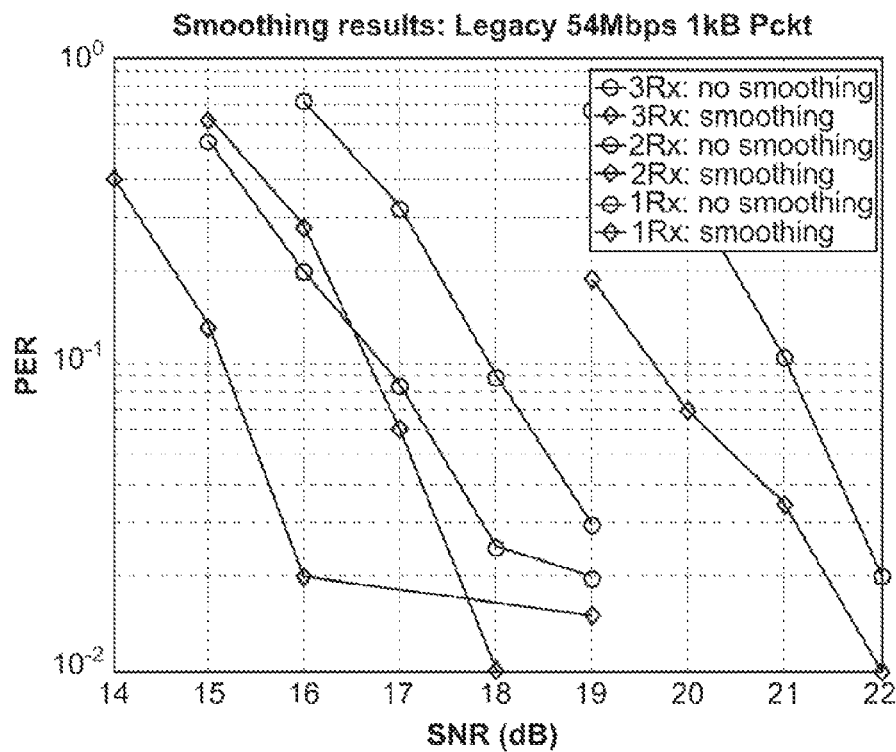

FIG. 7 shows the time domain channel estimation packet-error rate (PER) benefit for 1, 2 and 3 receiver implementations for legacy packets (SIMO case), in accordance with an embodiment of the present invention.

Figure 8:
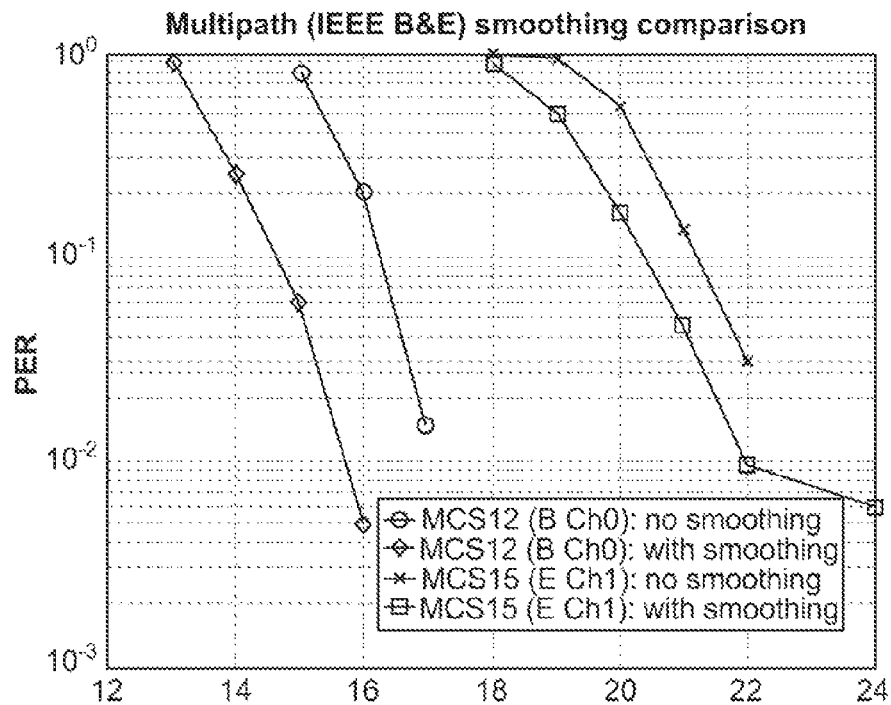

FIG. 8 shows the multi-path case, for IEEE 802.11n modulation coding scheme (MCS) 12, which is a two-stream 16 Quadratic amplitue modulation (QAM), for a 3T2R transceiver in IEEE channel B conditions, in accordance with an embodiment of the present invention.

FIG. 9 shows Table 1, which shows a comparison of the present feedback method with three other prior art techniques, in accordance with an embodiment of the present invention.

DETAILED DESCRIPTION OF THE PREFERRED EMBODIMENTS

Figure 1:
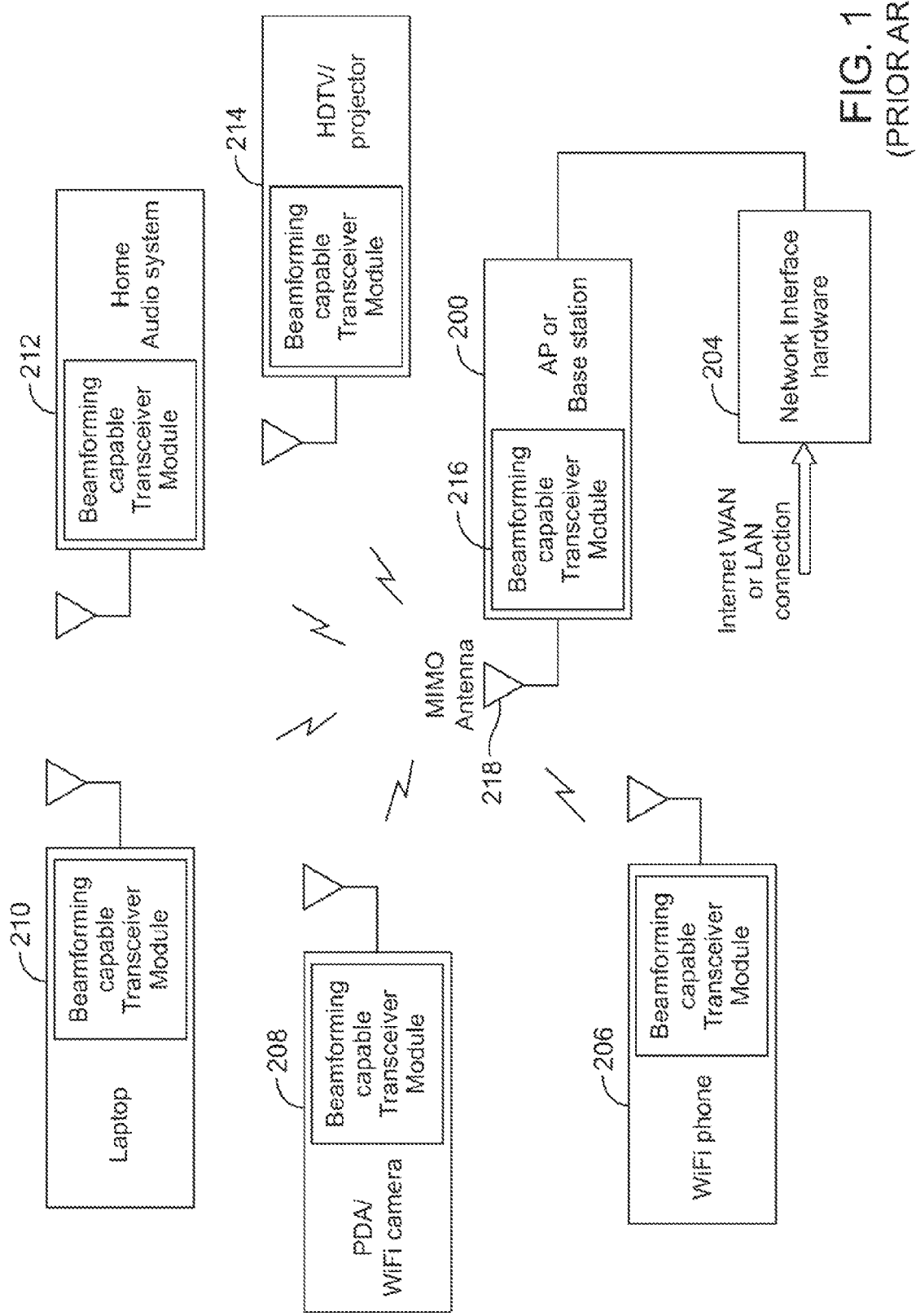
Figure 2:
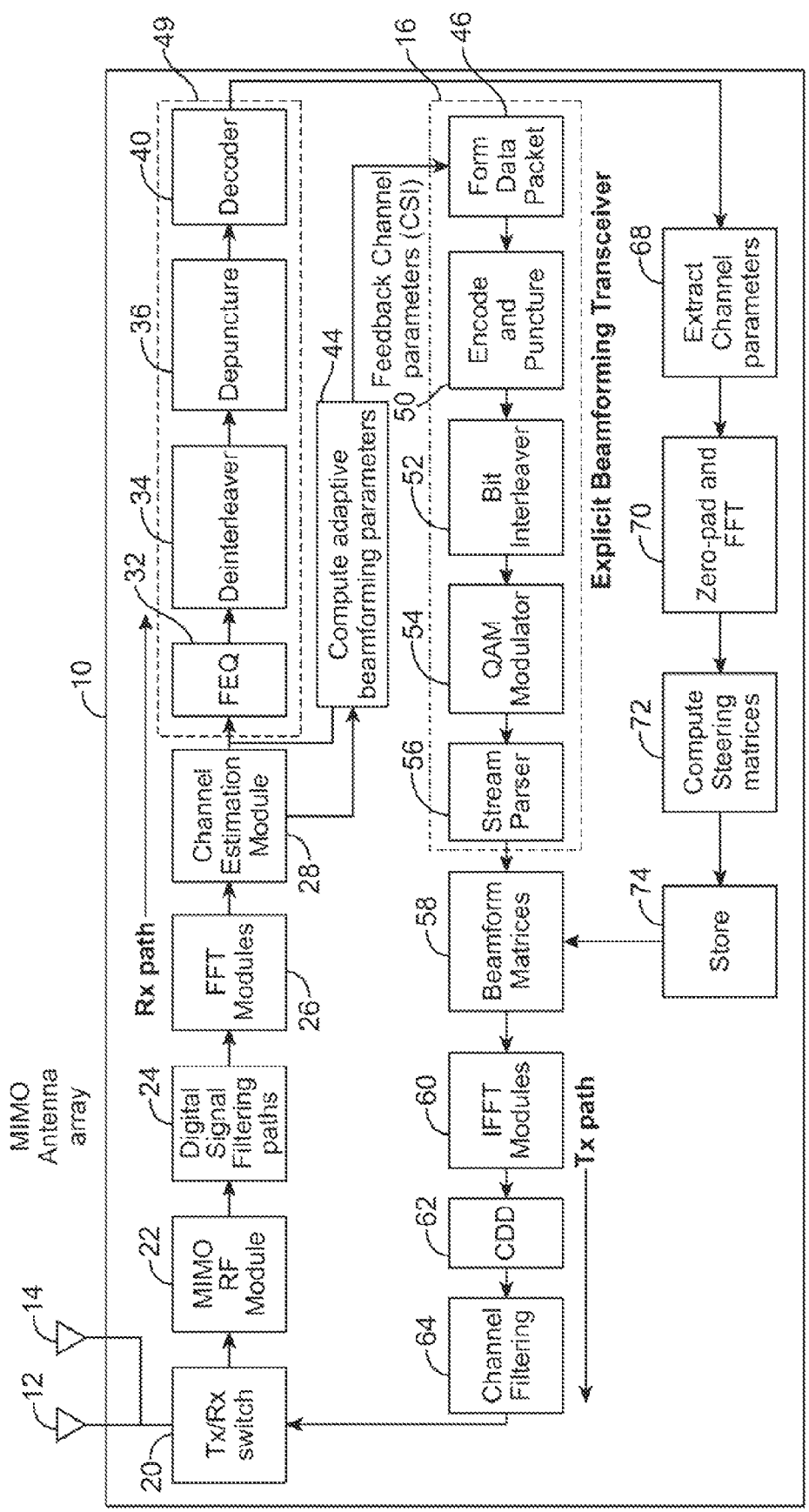
FIG. 2 shows a multi input multi output (MIMO) transceiver 10, in accordance with an embodiment of the present invention.

Referring now to FIG. 2, a multi input multi output (MIMO) transceiver 10 is shown to include a transmitter-receiver switch 20, a radio frequency (RF) module 22, a signal filtering module 24, a fast Fourier transform module (FFT) 26, a channel estimation module 28, an adaptive beamforming parameters module 44 and a decoding module 49, in accordance with an embodiment of the present invention. Also included in the MIMO transceiver 10 are an encoding module 16, a beamforming matrices module 58, an inverse fast Fourier transform (IFFT) module 60, a cyclic delay diversity (CDD) module 62 and a channel filtering module 64 as part of the transmission path, in accordance with an embodiment of the present invention. In addition, the MIMO transceiver 10 includes a channel parameters module 68, an FFT module 70, a steering matrices module 72 and a memory module 74.

The encoding module 16 includes a data forming module 46, an encode/puncture module 50, a bit interleaver 52, a modulator 54 and a stream parser 56. The decoding module 49 includes an equalizer 32, a deinterleaver 34, a depuncturer 36 and a decoder 40 as part of the receiver path.

The antennae 12 and 14 are coupled to the transmitter-receiver switch 20 which is coupled to the RF module 22 which is coupled to the signal processing module 24 which is coupled to the FFT module 26 which is coupled to the adaptive beamforming parameters module 44. The adaptive beamforming parameters module 44 is coupled to the data forming module 46 and the equalizer 32 which is coupled to the deinterleaver 34 which is coupled to the depuncturer 36 which is coupled to the decoder 40.

The decoder 40 is coupled to the channel parameters module 68 which is coupled to the FFT module 70 which is coupled to the steering matrices module 72 which is coupled to the memory module 74 which is coupled to the beamforming matrices module 58.

The data forming module 46 is coupled to the encode/puncture module 50 which is coupled to the bit interleaver 52 which is coupled to the modulator 54 which is coupled to the stream parser 56 which is coupled to the beamforming matrices module 58 which is coupled to the IFFT module 60 which is coupled to the CDD module 62 which is coupled to the channel filtering module 64 which is coupled to the transmitter-receiver switch 20.

Coupled to the MIMO transceiver 10 are two antennae 12 and 14. The MIMO transceiver 10 transmits information to a 2-antenna receiver (not shown in FIG. 2) which receives data packets and estimates the downstream channel state information (CSI) as part of the preamble processing. In explicit feedback beamforming systems, the CSI is relayed back to the two-transmitter two-receiver (2T2R) MIMO transceiver 10 using the transmitter module. Specifically, the relay is shown in FIG. 2 as the CSI is included in the input to the data forming module 46 to form a data packet to be sent through the transmission processing path. Similarly, steering matrices are used in the beamform matrices module 58 for transmitting the data packet back to the receiver at the other end of the communication link. In other embodiments of the present invention the MIMO transceiver 10 and the receiver each has one or more antennae.

Referring back to FIG. 2, incoming signals are received by the antennae and sent to the transmitter-receiver switch 20 wherein the mode of operation is set for receiving data. The RF module 22 filters out noise and unwanted signals from adjacent channels and in turn converts the incoming signals from RF to the baseband or some intermediate frequency (IF) to generate baseband signals. Baseband signals are converted at the signal filtering module 24 to digital streams which are converted at the FFT module 26 to received samples in the frequency domain.

The received samples are processed at the channel estimation module 28 to generate time domain beamforming parameters. In the embodiment of the present invention estimation of the channel state information (CSI) included in the received samples is performed in the time domain which offers improvement over the conventional techniques. Accordingly, the channel estimation module 28 has the ability to adapt to channel conditions so that the required amount of information needed to represent the channel is transmitted over the communication link to reduce the system overhead in favorable conditions and achieve higher throughput rates.

The time domain beamforming parameters are processed at the adaptive beamforming parameters module 44 to generate time domain adaptive beamforming parameters and frequency domain adaptive beamforming parameters. In the embodiment of the present invention conventional estimation techniques are applied in the channel estimation module 28 and adaptive beamforming module 44 to both reduce the amount of overhead in the feedback data and at the same time provide almost full CSI for transmission. In addition, the present invention is designed to automatically adapt to channel conditions to reduce the amount of overhead while improving the accuracy of the feedback CSI.

The time domain beamforming parameters included in the feedback CSI are sent to the encoding module 16 wherein the time domain beamforming parameters are put into packets at the data forming module 46 to form data packets. Data packets are encoded and punctured at the encode/puncture module 50 to generate encoded data which are interleaved at the bit interleaver 52 to generate data samples. Data samples are modulated into constellation points at the modulator 54 and parsed into streams to form a modulated data stream at the stream parser 56.

The frequency domain adaptive beamforming parameters are sent from the adaptive beamforming parameters module 44 to the equalizer 32 to generate equalized samples. Equalized samples are deinterleaved at the deinterleaver 34 to generate deinterleaved data to avoid having consecutive bits fall into a null subcarrier. The deinterleaved data is depunctured at the depuncturer 36 to generate depunctured data wherein all the samples are set back to one half rate. The depunctured data is decoded at the decoder 40 to generate data bits.

The data bits are sent to the channel parameters module 68 where the CSI are extracted from the data bits. The CSI include time domain adaptive beamforming parameters which are zero padded and converted to frequency domain adaptive beamforming parameters at the FFT module 70, as described in more detail hereinbelow. Steering matrices are computed at the steering matrices module 72 based on the frequency domain adaptive beamforming parameters. Thus, as the CSI are updated the steering matrices are updated and stored in the memory module 74. The steering matrices are sent to the beamforming matrices module 58 wherein beamforming matrices are subsequently applied to the modulated data stream.

The beamforming matrices are combined with the modulated data stream to generate beamformed data at the beamforming matrices module 58. Specifically, for a 2T2R system if the modulated data stream is denoted by [$s_1$, $s_2$] and the 2×2 beamform matrix by Q, and the beamformed data stream by [$x_1$, $x_2$] then, $$\begin{bmatrix} x_1 \\ x_2 \end{bmatrix} = \begin{bmatrix} q_{11} & q_{12} \\ q_{21} & q_{22} \end{bmatrix} \begin{bmatrix} s_1 \\ s_2 \end{bmatrix}. \quad \text{Eq. (2)}$$

Steering matrices are combined with the beamformed data stream to generate output data which are converted to time domain at the inverse fast Fourier transform (IFFT) module 60 and sent to the CDD module 62 wherein the output data streams are cyclically shifted to avoid nulls overlapping between the streams. The output of the CDD module 62 is sent to the channel filtering module 64 wherein unwanted signals are filtered out to generate output signals. Output signals are transferred to the transmitter-receiver switch 20 which, operating in the transmitter mode transmits the output signals to the receiver through the antennae 12 and 14.

The general consensus in the literature seems to be that estimation in the time domain is better posed since the problem there has reduced dimensionality. The downside to the approach is added complexity. Studies in the single transmitter single receiver (1T1R) case show that better estimation results may be achieved because there are simply fewer unknowns to solve. For example, in a basic 11 g single input single output (SISO) system, the channel estimate has 52 independent unknowns, whereas in the time domain the channel is often guaranteed to consist of only 16 significant, exponentially decaying taps (this is the assumption upon which the 11a standard is based, so that the cyclic prefix (CP) is not violated). So, on a per-tone basis, 52 measurements are used to determine 52 independent channel taps, when really, 52 measurements could be used to estimate the underlying 16-point time-domain sequence to gain fidelity in the equalization step. In other words, the fundamental problem is over-determined by more than a factor of 3, so some performance is sacrificed in the current 11 g and Smart antenna (SA) systems by doing pure frequency domain channel estimation. In fact, if a 16-tap channel model is used, the mean-square error (MSE) estimate could be improved by about 5.1 dB, per-tone. (However, not all tones benefit equally, as will be seen in the simulations hereinbelow, the edge-tones near the guard band do not get the full benefit.) Over-determined systems are simply more robust, and less susceptible to estimation errors. In addition, as in any estimation problem, over-parameterization will only degrade performance, so it is best to keep the assumed channel length as short as possible.

Also, it is always best to use as much model information as possible. For the least-squares estimate described below, only channel length is used; a minimum mean square error (MMSE) estimate would employ power delay spread information too, also as discussed hereinbelow.

Several error estimation techniques are presented hereinbelow.

Measurement Model: SISO Case

It is easy to extend the least square (LS) channel estimate to the multi input multi output (MIMO) case, once the corresponding result is found for the one-transmitter one-receiver (1T1R) case. The orthogonal frequency domain multiplexing (OFDM) baseband model may be written as:

$$y = XFg_{zp} + n. \quad \text{Eq. (3)}$$

The variable $g_{zp}$ is the vector of channel coefficients, zero-padded to length N (N=64 for the 802.11a/g/n 20 MHz system). F is the FFT operator, expressed as a matrix; X is a diagonal matrix of transmitted symbols (e.g., the preamble), n is the noise vector, and y is the output of the FFT. It is noted that the channel in frequency domain is:

$$h = Fg_{xp} = Tg, \quad \text{Eq. (4)}$$

where T is the first L columns of the FFT matrix, and L (L<N) is the assumed maximum length of the channel. This simplification in the measurement equation is carried forth to simplify the resulting estimators. Further, it may be assumed that only the rows of F that correspond to a subcarrier frequency are needed to be retained, so that T is reduced in size to 56XL (for 11n) or 52XL (for 11a/g).

MMSE Channel Estimation (SISO Case)

For a linear estimate of h it is assumed that $$\hat{h} = T\hat{g} = TMy, \quad \text{Eq. (5)}$$

where M is to be determined. To find $M_{mmse}$ the cost function needs to be minimized, i.e.

$$J_{mmse} = \langle e, e \rangle, \quad \text{Eq. (6)}$$

where the brackets indicate the expectation operator of the inner product, and the error is defined as: $e = g - \hat{g}$. Satisfying the orthogonality condition:

$$\langle e, y \rangle = 0, \quad \text{Eq. (7)}$$

minimizes the cost function. Substituting for the error, the orthogonality condition leads to the following relationship:

$$R_{gg}T^*X^* = MR_{yy} \Rightarrow M_{mmse} = R_{gg}T^*X^*R_{yy}^{-1} \quad \text{Eq. (8)}$$

where $$R_{yy} = XTR_{gg}T^*X^* + \sigma_n^2 I \quad \text{Eq. (9)}$$

So, the MMSE channel estimate in frequency domain is:

$$\hat{h}_{mmse} = T\hat{g}_{mmse} = TM_{mmse}y = TR_{gg}T^*X^*R_{yy}^{-1}y. \quad \text{Eq (10)}$$

Of course, the time domain estimate, with reduced dimension (L taps) is:

$$\hat{g}_{mmse} = M_{mmse}y = R_{gg}T^*X^*R_{yy}^{-1}y. \quad \text{Eq. (11)}$$

This is a rather complex estimate to compute, unless some assumptions about the channel auto-covariance and noise level are made ahead of time, so that the inverse may be computed and stored ahead of time.

Least-Squares (LS) Channel Estimation (SISO Case)

A simpler estimate may be computed using simple linear least squares. Here the cost function is deterministic:

$$J_{ls} = (y - XTg)^*(y - XTg). \quad \text{Eq. (12)}$$

Taking the partial of the cost function with respect to the channel and setting it to zero:

$$\partial J_{ls}/\partial g = 2(y - XTg)^*(-XT) = 0 \Rightarrow y^*XT = g^*T^*X^*T \quad \text{Eq. (13)}$$

Solving for the channel gives the LS estimator:

$$\hat{g}_{ls} = (T^*X^*XT)^{-1}T^*X^*y. \qquad \text{Eq. (14)}$$

It is noted that if the full FFT matrix F is used, instead of T, (which means a full zero-padded channel length is estimated: $\hat{g}_{ls,zp} = F^*X^*y$) then the problem reduces to the simple per-tone (frequency domain) estimate:

$$\hat{h}_{ls,per\text{-}tone} = Ty, \qquad \text{Eq. (15)}$$

which is the current 11 g (1T1R) estimate. This is necessarily a degraded estimate since it over-parameterizes the channel.

LS Channel Estimate: MIMO Case, Draft 802.11N Preamble

The formulation hereinabove may be extended to the MIMO case, using 2T2R configuration, but without loss of generality. In fact the formulation below is readily applied to the 1T1R, 1T2R, or 2T3R case, using the associated preambles.

The extension to MIMO is made by first augmenting the measurement equations. For each subcarrier (k=1, ... 56), there is a corresponding 2×2 matrix:

$$H(k) = \begin{bmatrix} h_{00}(k) & h_{01}(k) \\ h_{10}(k) & h_{11}(k) \end{bmatrix}, \qquad \text{Eq. (16)}$$

which maps transmitted Walsh-Hadamard preamble symbol vector to the received vector, at each subcarrier, as:

$$\begin{bmatrix} r_{00} & r_{01} \\ r_{10} & r_{11} \end{bmatrix} = H \begin{bmatrix} +s & -s \\ +s & +s \end{bmatrix} \qquad \text{Eq. (17)}$$

$$= \begin{bmatrix} h_{00} & h_{01} \\ h_{10} & h_{11} \end{bmatrix} \begin{bmatrix} +s & -s \\ +s & +s \end{bmatrix}$$

$$= s \begin{bmatrix} h_{00} & h_{01} \\ h_{10} & h_{11} \end{bmatrix} \begin{bmatrix} +1 & -1 \\ +1 & +1 \end{bmatrix}$$

where the index k is dropped for simplified notation, and s is the BPSK preamble symbol on the $k^{th}$ subcarrier. It is noted that cyclic delay diversity (CDD) is included on the second transmit stream as part of the channel; this is valid since the data portion will also include this delay diversity. Here it is found that per-tone estimation is possible, since the system of equations is uniquely solvable for the four channel unknowns. That is:

$$H = \begin{bmatrix} h_{00} & h_{01} \\ h_{10} & h_{11} \end{bmatrix} = \frac{s}{2} \begin{bmatrix} r_{00} & r_{01} \\ r_{10} & r_{11} \end{bmatrix} \begin{bmatrix} +1 & +1 \\ -1 & +1 \end{bmatrix} \qquad \text{Eq. (18)}$$

Now the time domain channel matrix is $$G(l) = \begin{bmatrix} g_{00}(l) & g_{01}(l) \\ g_{10}(l) & g_{11}(l) \end{bmatrix} \qquad \text{Eq. (19)}$$

where it is assumed, as above that time domain channel index l is limited to L (16, or 24, for example). The received vectors may be received, at the output of the first receiver FFT module as:

$$\begin{bmatrix} r_{00} \\ r_{01} \end{bmatrix} = \begin{bmatrix} S & \\ & S \end{bmatrix} \begin{bmatrix} +I & +I \\ -I & +I \end{bmatrix} \begin{bmatrix} h_{00} \\ h_{01} \end{bmatrix} + n \qquad \text{Eq. (20)}$$

$$= \begin{bmatrix} S & \\ & S \end{bmatrix} \begin{bmatrix} +I & +I \\ -I & +I \end{bmatrix} \begin{bmatrix} T & \\ & T \end{bmatrix} \begin{bmatrix} g_{00} \\ g_{01} \end{bmatrix} + n$$

$$= A \begin{bmatrix} g_{00} \\ g_{01} \end{bmatrix} + n$$

In the measurement equation (19), each FFT output vector $(r_{00}, r_{01})$ is 56 elements each, so there are 112 measurements. For example, if the channel vectors ($g_{00}$, $g_{01}$, etc.) are 16 elements each then there are 64 unknowns. So, this is a well-posed (over-determined) system of equations. The matrix S is diagonal, containing the transmitted 11n Long training field (LTF) symbol. Similarly for the second pair of channel coefficients:

$$\begin{bmatrix} r_{10} \\ r_{11} \end{bmatrix} = \begin{bmatrix} S & \\ & S \end{bmatrix} \begin{bmatrix} +I & +I \\ -I & +I \end{bmatrix} \begin{bmatrix} h_{10} \\ h_{11} \end{bmatrix} + n \qquad \text{Eq. (21)}$$

$$= A \begin{bmatrix} g_{10} \\ g_{11} \end{bmatrix} + n$$

where in equation (20) above $$A = \begin{bmatrix} S & \\ & S \end{bmatrix} \begin{bmatrix} +I & +I \\ -I & +I \end{bmatrix} \begin{bmatrix} T & \\ & T \end{bmatrix}.$$

Using the general LS solution for channel estimate described hereinabove, it is found that:

$$\hat{g}_{ls} = \begin{bmatrix} \hat{g}_{00} \\ \hat{g}_{01} \end{bmatrix}_{ls} = (A^*A)^{-1}A^*r, \qquad \text{Eq. (22)}$$

and substituting matrices from the MIMO measurement set, it is found that:

$$\begin{bmatrix} \hat{g}_{00} \\ \hat{g}_{01} \end{bmatrix}_{ls} = \qquad \text{Eq. (23)}$$

$$\left( \begin{bmatrix} T & 0 \\ 0 & T \end{bmatrix}^* \begin{bmatrix} +I & -I \\ +I & +I \end{bmatrix} \begin{bmatrix} +I & +I \\ -I & +I \end{bmatrix} \begin{bmatrix} T & 0 \\ 0 & T \end{bmatrix} \right)^{-1} \begin{bmatrix} T & 0 \\ 0 & T \end{bmatrix}^* \begin{bmatrix} +I & -I \\ +I & +I \end{bmatrix} \begin{bmatrix} S & 0 \\ 0 & S \end{bmatrix} \begin{bmatrix} r_{00} \\ r_{01} \end{bmatrix} =$$

$$\frac{1}{2} \begin{bmatrix} (T^*T)^{-1} & 0 \\ 0 & (T^*T)^{-1} \end{bmatrix} \begin{bmatrix} T^* & 0 \\ 0 & T^* \end{bmatrix} \begin{bmatrix} S(r_{00} - r_{01}) \\ S(r_{00} + r_{01}) \end{bmatrix}$$

The final channel vectors in the frequency domain are then found to be $$\begin{bmatrix} \hat{h}_{00} \\ \hat{h}_{01} \end{bmatrix}_{ls} = \begin{bmatrix} T & 0 \\ 0 & T \end{bmatrix} \begin{bmatrix} \hat{g}_{00} \\ \hat{g}_{01} \end{bmatrix}_{ls}. \qquad \text{Eq. (24)}$$

Of course, if the channel parameters are not needed to be sent back to the transmitter, the time domain result does not need to be computed explicitly, all the estimation process is combined into one large matrix, and stored ahead of time. The total estimator has the form:

$$M_{ls} = \begin{bmatrix} T & 0 \\ 0 & T \end{bmatrix} \begin{bmatrix} (T^*T)^{-1} & \\ & (T^*T)^{-1} \end{bmatrix} \begin{bmatrix} T & 0 \\ 0 & T \end{bmatrix}^*. \qquad \text{Eq. (25)}$$

It is noted that a typical MIMO receiver which uses straight per-tone frequency domain estimation, has the simplified form in the prior art communication systems, given by $$\begin{bmatrix} \bar{h}_{00} \\ \bar{h}_{01} \end{bmatrix} = \frac{1}{2} \begin{bmatrix} S(r_{00} - r_{01}) \\ S(r_{00} + r_{01}) \end{bmatrix} \qquad \text{Eq. (26)}$$

The performance improvement discussed hereinabove comes as a result of this matrix operation. This is a block diagonal matrix, with 56×56 elements of the form:

$$M_{ls} = T(T^*T)^{-1}T^*. \qquad \text{Eq. (27)}$$

To simplify implementation, the only matrix operation that needs to be implemented is the inverse portion: $(T^*T)^{-1}$. That is because, as discussed hereinabove the operations $T^*$ and $T$ may be implemented using partial inverse-FFT (IFFT) and FFT modules, respectively. The total diagram for the channel estimate in both the time and frequency domains, and the feedback of the time domain channel parameters is shown in FIG. 3.

Figure 3:
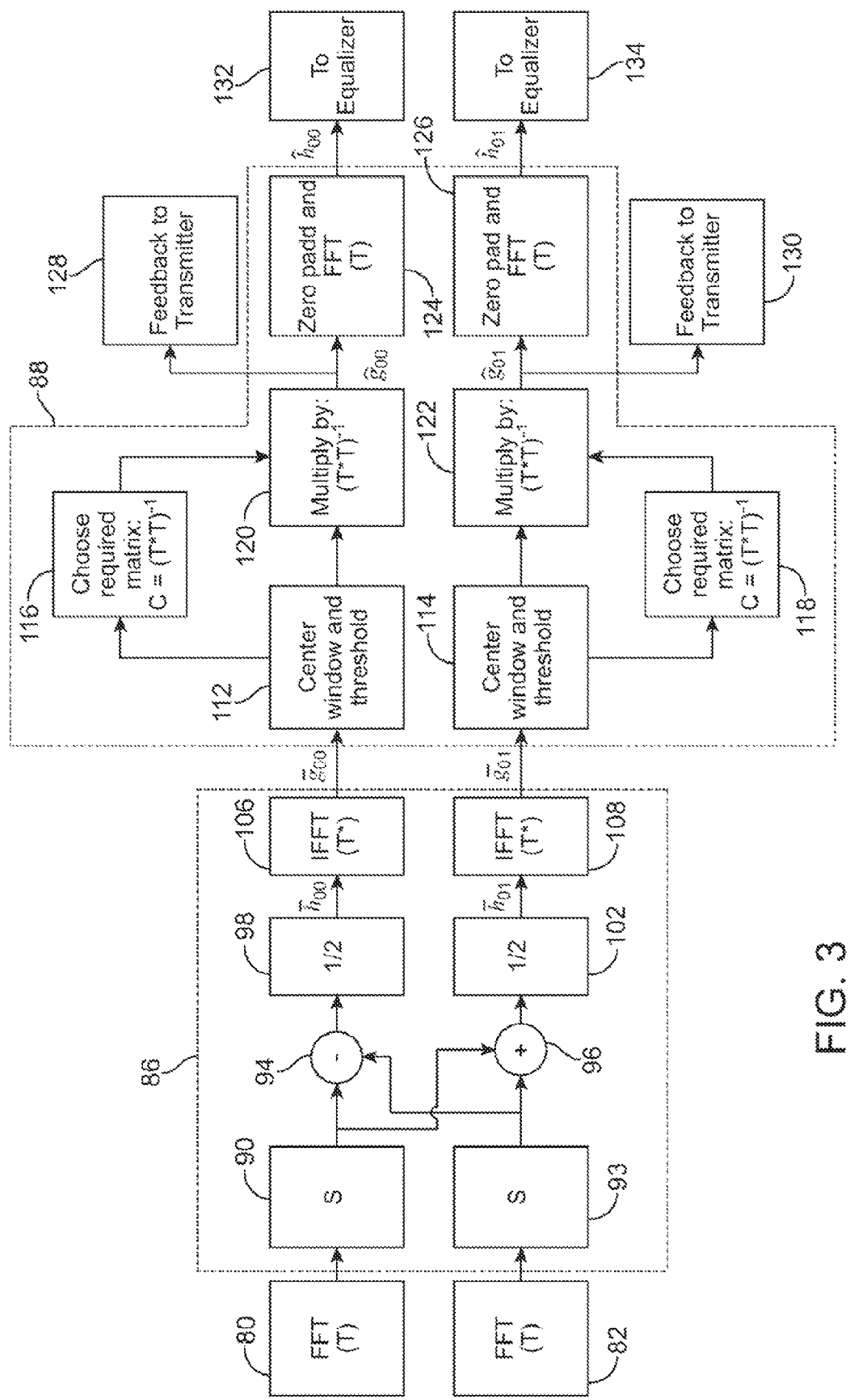
FIG. 3 shows a channel estimation module 86 coupled to an adaptive beamforming parameters module 44, in accordance with an embodiment of the present invention.

Referring now to FIG. 3, a channel estimation module 86 is shown coupled to an adaptive beamforming parameters module 44, in accordance with an embodiment of the present invention. The channel estimation module 86 includes preamble modules 90 and 92, junctions 94 and 96, scaling modules 98 and 102, and IFFT modules 106 and 108, in accordance with an embodiment of the present invention. Also included in FIG. 3 are two FFT modules 80 and 82.

The FFT modules 80 and 82 are coupled to the preamble modules 90 and 93, respectively. Preamble modules 90 and 93 are both coupled to the junctions 94 and 96. Junction 94 is coupled to the scaling module 98 which is coupled to the IFFT module 106. Junction 96 is coupled to the scaling module 102 which is coupled to the IFFT module 108.

Received samples as output of the FFT modules 80 and 82 are transferred to the preamble modules 90 and 93. In the example described hereinabove the first received sample ($r_{00}$ $r_{01}$) having two elements is processed by the preamble modules 90 and 93 having the long preamble training sequence which includes Walsh-Hadamard preamble symbol. The output of the preamble module 93 is subtracted from the output of the preamble module 90 at junction 94 and multiplied by ½ at the scaling module 98 to generate the first component of the frequency domain beamforming parameter. The output of the preamble module 90 is added to the output of the preamble module 93 at junction 96 and multiplied by ½ at the scaling module 102 to generate the second component of the frequency domain beamforming parameter according to equation (25).

Time domain beamforming parameters $\bar{g}_{00}$ and $\bar{g}_{01}$ are computed at the IFFT modules 106 and 108 by applying $T^*$ to the frequency domain beamforming parameters. Note, the forgoing description to compute $\bar{g}_{00}$ and $\bar{g}_{01}$ is repeated to find $\bar{g}_{10}$ and $\bar{g}_{11}$ to complete the 2×2 time domain channel matrix estimate (Eq. (19)).

The adaptive beamforming parameter module 88 includes windowing modules 112 and 114, matrix modules 116 and 118, multiplication modules 120 and 122 and FFT modules 124 and 126, in accordance with an embodiment of the present invention. The windowing modules 112 and 114 are coupled to the matrix modules 116 and 118 and multiplication modules 120 and 122, respectively. Matrix modules 116 and 118 are coupled to the multiplication modules 120 and 122, respectively.

The time domain channel estimate is sent to the windowing modules 112 and 114 wherein a threshold value is assigned and windows with adaptable channel length are found such that the window captures the desired level of channel estimate tap energy, or some other metric. For example, windows may be widened until taps remaining outside of the window have magnitudes below a prescribed threshold value. The taps not included in the window are determined to have negligable effect on the channel model and are excluded from the channel estimation process. The window center can be chosen using different techniques. In one embodiment of the present invention the tap with the highest tap energy (or magnitude) is centered, and the window is opened about the center until the taps outside of the window are below the threshold. In another embodiment of the present invention, a "center of gravity" algorithm is employed to find the window center, and the window may be made wider until the total tap energy outside of the window falls below a prescribed percentage of the tap energy contained in the window, referred to as the window tap energy. In the latter scheme, the channel taps outside of the window, by contributing only a small fraction of the total channel energy, may be excluded from the estimation process. The windowing operation is further discussed below, in reference to FIG. 4, which describes yet another technique that windows the channel taps until a fixed percentage of total energy is captured. After the windows are centered, the channel tap data therein is transferred from the windowing modules 112 and 114 to the matrix modules 116 and 118, respectively.

Based on the length of the window, the matrix $C=(T^*T)^{-1}$ is computed, or selected from a set of pre-computed and stored values, in the matrix modules 116 and 118 and transferred to the multiplication modules 120 and 122 wherein time domain adaptive beamforming parameters are calculated according to $$\begin{bmatrix} \hat{g}_{00} \\ \hat{g}_{01} \end{bmatrix} = \begin{bmatrix} (T^*T)^{-1} & 0 \\ 0 & (T^*T)^{-1} \end{bmatrix} \begin{bmatrix} \bar{g}_{00} \\ \bar{g}_{01} \end{bmatrix} \qquad \text{Eq. (28)}$$

The time domain adaptive beamforming parameters $$\begin{bmatrix} \hat{g}_{00} \\ \hat{g}_{01} \end{bmatrix}$$

(i.e., the channel estimate, also referred to as channel state information (CSI)) are then used in two separate ways. First, they are sent to the transmitter as indicated by modules 128 and 130, wherein they are formed into a data packet to be sent back to the opposite end of the communication link. Secondly, the CSI is processed by the FFT modules 124 and 126. By zero padding the time domain adaptive beamforming parameters and performing the FFT operation in modules 124 and 126, the frequency domain adaptive beamforming parameters are generated. The equivalent operation involves a direct multiplication with the T matrix, according to equation (23). Zero padding refers to increasing the length of the CSI parameters with zero values so that the vector has the proper length (i.e., 64, or 128) for input to the FFT. The frequency domain adaptive beamforming parameters are sent to the equalizer modules 132 and 134, in order to train the frequency domain equalizer (FEQ).

Figure 4:
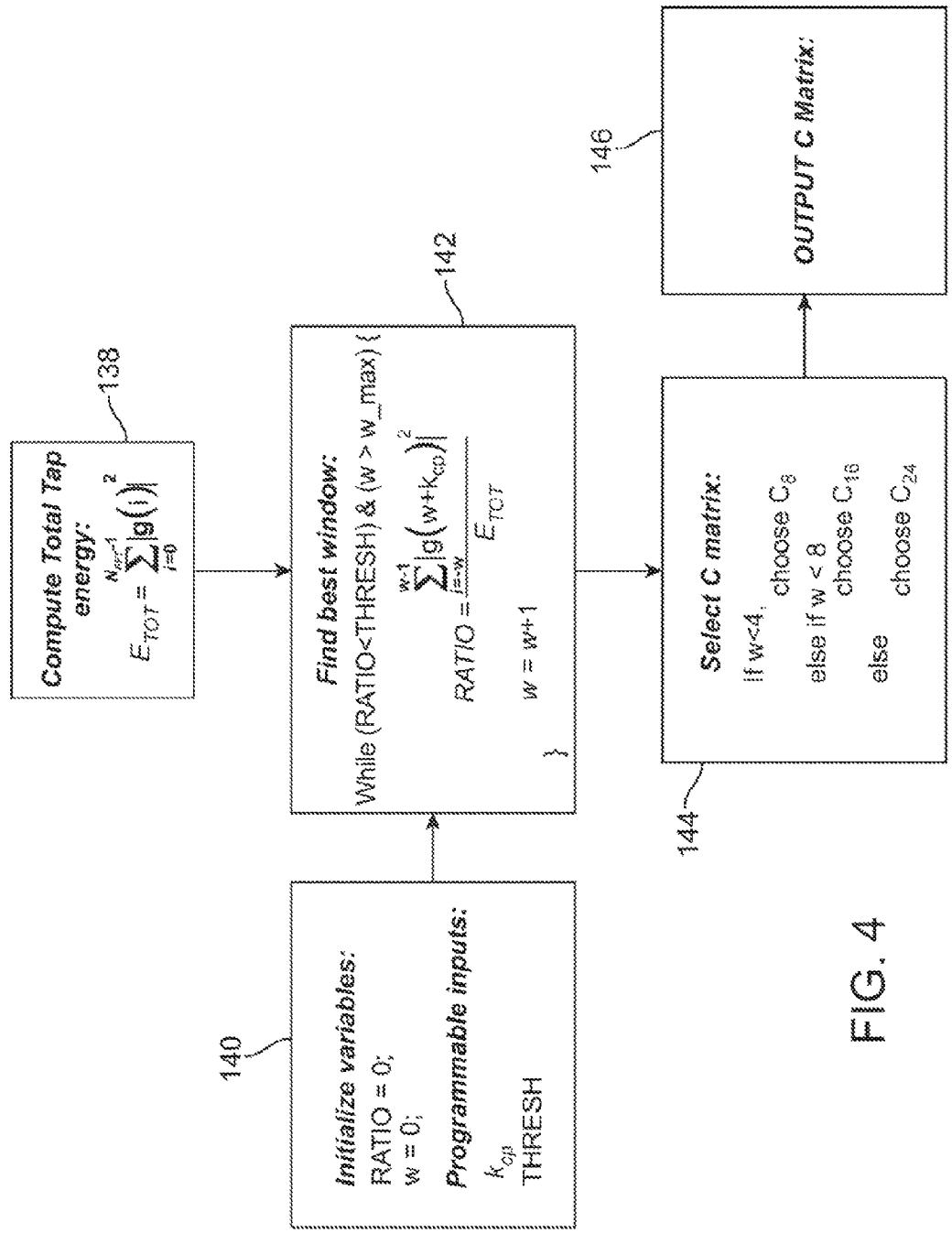
FIG. 4 shows a block diagram of the windowing module and matrix module, in accordance with an embodiment of the present invention.

Referring now to FIG. 4, a block diagram of the windowing module and matrix module is shown, in accordance with an embodiment of the present invention. At step 138 the total tap energy of the entire channel is computed. Also specified are values for $k_{cp}$ and threshold (THRESH). The RATIO is found at step 142 for the case where RATIO<THRESH and w<w_max by dividing the tap energy in a window by the total tap energy. Afterwards the value of w is increased by one. The window length value w is increased until the computed RATIO meets or exceeds the specified threshold, i.e. THRESH. The computed RATIO is referred to as the best window RATIO.

The values for THRESH and w_max are intended to be programmable values. Increasing the energy threshold (i.e., THRESH) will tend to force most of the channel taps to be included in the estimation, and result in larger C matrices (e.g. $C_{24}$) to be chosen. On the other hand, reducing the THRESH will tend to eliminate more taps, treating them as negligible, and yield smaller C matrices for estimation. The w_max parameter allows the designer to put a limit on the size of the channel estimate window. This is useful when the channel is predetermined to contain little multi-path effects, and is well characterized by a short impulse response (i.e., have fewer significant taps).

Based on the best window RATIO the C matrix is determined at step 144. For example, in practice, if the distance over which the output signals are transmitted is relatively short, corresponding to a wireless channel with little multi-path, then the first few taps, i.e. w<4, will include most of the information which results in selection of the matrix $C_8$, having dimension 8×8, at block 144.

Similarly, if the range of transmission is medium, i.e. w<8, $C_{16}$ is selected having dimension 16×16 and for long range of transmission $C_{24}$ is selected having dimension 24×24. Thus the C matrix is adapted to the channel conditions and the output is indicated at step 146.

A key element in channel estimation process is the matrix $C=(T^*T)^{-1}$. Some key simplifying features of C are:

C is a real matrix (no complex elements), and symmetric. Further, each diagonal, main and sub-diagonal is a symmetric sequence, thereby allowing further reduction in storage and implementation complexity.

C is also shift invariant. This means that even if different time-domain windows are used on the different substream estimates, $\bar{g}_{00}$ and $\bar{g}_{01}$, the corresponding matrix C stays the same. This is important for systems adhering to the 802.11n standard, since cyclic shift diversity is applied to the different preamble substreams.

Because of these simplifications, it is possible to store multiple copies of the matrix, corresponding to differing channel conditions. For example, three different matrices may be stored, $C_8$ having dimension 8×8, $C_{16}$ having dimension 16×16 and $C_{24}$ with size 24×24. The intermediate vector $\bar{g}_{00}$ can be windowed to find the window width in samples such that the channel tap energy of the partial vector exceeds a desired percentage of the total tap energy in the vector $\bar{g}_{00}$. One implementation of channel windowing is shown in FIG. 4.

For implementation simplicity, a good implementation of the C matrix multiplication is using an SVD decomposition $C=(T^*T)^{-1}=V^*\Sigma V$, and pre-storing the V and $\Sigma$ matrices. The decomposition allows all the eigenvalues precision to be stored in the diagonal matrix $\Sigma$, and while the direction matrix, which is full, has well scaled unitary columns and rows.

Extension of the foregoing results to several MIMO systems are now described hereinbelow.

Extension to 2T3R Case

For completeness, we note that in order to support a 3-receiver case, the additional sub-channels are estimated using the same estimator. That is:

$$\begin{bmatrix} \hat{h}_{20} \\ \hat{h}_{21} \end{bmatrix}_{ls} = M_{ls} r_2$$

Eq. (29)

where $r_2$ is the output from the third FFT module.

Extension to 3 Stream Case 3T3R

The technique described hereinabove extends to the 3-stream case. The 802.11n standard Walsh-Hadamard preamble polarity structure as described on page 283, Eq. 20-27 of the 802.11n standard is given as $$P_{WH} = \begin{bmatrix} +1 & -1 & +1 & +1 \\ +1 & +1 & -1 & +1 \\ +1 & +1 & +1 & -1 \\ -1 & +1 & +1 & +1 \end{bmatrix}.$$

Eq. (30)

When three streams are to be transmitted, the first three rows determine the polarity structure of the sent preamble. In this case four columns of the matrix means that there is an extra measurement to be used in determining the 3×3 channel matrix. Using the same formulation above, the time-domain channel coefficients may be derived as:

$$\begin{bmatrix} \hat{g}_{00} \\ \hat{g}_{01} \\ \hat{g}_{02} \end{bmatrix}_{ls} = \frac{1}{4} \begin{bmatrix} (T^*T)^{-1} & & \\ & (T^*T)^{-1} & \\ & & (T^*T)^{-1} \end{bmatrix} \begin{bmatrix} T^* & & \\ & T^* & \\ & & T^* \end{bmatrix} \begin{bmatrix} S(r_{00} - r_{01} + r_{02} + r_{03}) \\ S(r_{00} + r_{01} - r_{02} + r_{03}) \\ S(r_{00} + r_{01} + r_{02} - r_{03}) \end{bmatrix}.$$

Eq. (31)

This gives the first column of the channel matrix. The foregoing approach may be used here to determine the second and third columns of the channel matrix by replacing $r_{00}$ with $r_{10}$, $r_{01}$ with $r_{11}$, etc.

Extension to 4 Stream Case 4T4R Case

The extension for the Walsh-Hadamard for 4-stream case follows directly from the 3-stream case, since the preamble has four columns, with just an extra transmission row. The fourth element of the channel estimate is given as:

$$\hat{g}_{03} = \frac{1}{4}(T^*T)^{-1}T^*S(-r_{00} + r_{01} + r_{02} + r_{03}).  \quad \text{Eq. (32)}$$

To show improvements in mean-square error (MSE) achieved by the embodiment of the present invention an 11 g 1T1R system is considered which is a single input single output system. The estimator is given by $$M_{ls,1T} = T(T^*T)^{-1}T^*S_0. \quad \text{Eq. (33)}$$

In the basic 11 g system, because there are two training symbols and only 52 out of 64 sub-carriers are used, it is expected that basic frequency domain (per-tone) estimation will provide:

Channel_Estimate_$MSE$=Channel_$SNR$+10*log(2)+ 10*log(64/52)~34 dB

Further, if the actual channel has only 16 significant taps, then it is expected that time domain estimation will give MSE improvements of:

$MSE$_gain(16 taps)=10*log(52/16)=5.1 dB, or:

$MSE$_gain(24 taps)=10*log(52/24)=3.4 dB.

These gains are clearly seen in the FIG. 5, except for a few edge-tones, and near Direct Current or zero frequency (DC). A similar curve may be drawn for the 8-tap case.

Referring now to FIG. 5, a frequency domain estimator 152, a 24-tap time domain estimation 154 and a 16-tap time domain estimation 156 of MSE for each subcarrier is shown, in accordance with an embodiment of the present invention. The results shown in FIG. 5 are for an Additive white Guassian noise (AWGN) channel.

Similar results hold for a faded channel. Referring now to FIG. 6, the estimation of mean square error (MSE) of a faded channel is shown with g=(1 0.1 1) that has two deep nulls in-band, in accordance with an embodiment of the present invention. A frequency domain estimation 158, a 24-tap time domain estimation 160 and a 16-tap time domain estimation 162 of normalized MSE for each subcarrier is shown in FIG. 6.

Applying the time-domain channel estimation will improve tap estimates by approximately 5.4 decibels (dB) (corresponding to the ratio 56/16) in MSE. Simulation using the RT2830C code base shows that the improvement will result in a 1.25~2.0 dB packet-error rate (PER) performance benefit. FIG. 7 illustrates packet-error rate (PER) time domain channel estimation benefit for 1, 2 and 3 receiver implementations for legacy packets (SIMO case), in accordance with an embodiment of the present invention. There is almost 2.0 dB benefit to the maximum ratio combining (MRC) performance when smoothing, i.e., time domain channel estimation is applied to the channel estimation for the three-receiver configuration.

Referring now to FIG. 8, the multi-path case, for IEEE 802.11n modulation coding scheme (MCS) 12, which is a two-stream 16 Quadratic amplitue modulation (QAM), for a 3T2R transceiver in IEEE channel B conditions, there is approximately 1.8 dB improvement when using the smoothing algorithm described hereinabove, in accordance with an embodiment of the present invention. For the Channel E case (larger multi-path), the benefit is closer to 0.8 dB.

To see the benefit of reduced overhead, the present feedback method is compared with three other prior art techniques, and the results are recorded in Table 1, in accordance with an embodiment of the present invention. The formula for calculating the bit load required for the different methods are listed, and are a function of the parameters: number of channel rows (or receivers) $N_r$, number of channel columns (or transmitters) $N_c$, number of bits per coefficient $N_b$, number of subcarriers $NS_{sc}$, and number of taps in time-domain channel estimate $N_L$. The number of bits shown assumes 8 bit coefficients for all parameters, a 3×3 channel ($N_r=N_c=3$), and 56 OFDM sub-carriers.

As can be seen, one embodiment of the present invention (Method 4) reduces overhead compared to the Full CSI (method 1) by 86%, 72%, and 58%, depending on the channel length condition. That is, if the channel conditions are severe, and an $N_L=24$ is required to capture the full length of the multi-path, then still, the overhead may be reduced 58% compared to the Full CSI method, described in the standard 802.11n. When channel conditions are mild, and $N_L=8$, the reduction may achieve an 86% reduction. It is important to note that when comparing to the Compressed Feedback (Method 3), the number of bits is comparable in moderate channel conditions, but the compressed feedback method feeds back an incomplete CSI, and thus is not equivalent to the embodiment of the present invention whereby nearly the Full CSI is fed back to the other end of the communication link.

Although the present invention has been described in terms of specific embodiment, it is anticipated that alterations and modifications thereof will no doubt become apparent to those more skilled in the art. It is therefore intended that the following claims be interpreted as covering all such alterations and modification as fall within the true spirit and scope of the invention.

What is claimed is:

1. A multi input multi output (MIMO) transceiver comprising:
a channel estimation module responsive to received samples including channel state information (CSI) and operative to generate time domain beamforming parameters;
an adaptive beamforming parameters module coupled to receive said time domain beamforming parameters and operative to generate time domain adaptive beamforming parameters, said adaptive beamforming parameters module operative to process said time domain beamforming parameters to generate frequency domain adaptive beamformig parameters, said adaptive beamforming parameters module further operative to generate a window for estimating said channel state information (CSI), said received samples including a plurality of taps each of which having a tap energy, said window including one or more of said taps and a window tap energy;
a decoding module coupled to receive said frequency domain adaptive beamforming parameters and operative to generate data bits;
a channel parameters module coupled to receive said data bits and operative to extract said time domain adaptive beamforming parameters;
an encoding module coupled to receive said time domain adaptive beamforming parameters and operative to generate a data packet, said encoding module operative to encode said data packet to generate a modulated data stream; and a beamform matrices module coupled to receive said modulated data stream and operative to generate a beamformed data stream based on said frequency domain adaptive beamforming parameters, said MIMO transceiver operative to process said beamformed data stream to generate output signals and to transmit said output signals by forming beam patterns, wherein said window has an adaptable length to include a desired level of said window tap energy, said window being centered to open about the tap with the highest tap energy, said window being assigned a prescribed threshold, said received sample having one or more taps outside of said window and having tap energies below said threshold.

2. A multi input multi output (MIMO) transceiver as recited in claim 1 wherein said window being centered by employing a center of gravity algorithm.

3. A multi input multi output (MIMO) transceiver as recited in claim 1 wherein said window has associated therewith a prescribed THRESH value to determine the length of said window, wherein said THRESH value is increased to enlarge the length of said window to include a substantially large number of said taps, and said THRESH value is decreased to reduce the length of said window to include a substantially small number of said taps.

4. A multi input multi output (MIMO) transceiver as recited in claim 3 wherein said window has associated therewith a w_max parameter for placing a limit on the length of said window by predetermining said channel state information (CSI) to be a short impulse response having a substantially few significant taps.

5. A multi input multi output (MIMO) transceiver as recited in claim 4 wherein said adaptive beamforming parameters module is operative to generate a RATIO for said window, said adaptive beamforming parameters module operative to find a best window RATIO.

6. A multi input multi output (MIMO) transceiver as recited in claim 5 wherein said adaptive beamforming parameters module further including a matrix module and operative to generate a C matrix based on the length of said best window RATIO, said THRESH value increased to enlarge the size of said C matrix, said THRESH value decreased to reduce the size of said C matrix.

7. A multi input multi output (MIMO) transceiver as recited in claim 6 having a two transmitter two receiver (2T2R) configuration wherein said channel estimation module being responsive to a matrix S including the transmitted 1 ln Long training field (LTF) symbol, said channel estimation module being responsive to said received symbols characterized by ($r_{00}$, $r_{01}$) and operative to process the same to generate said frequency domain beamforming parameters $\bar{h}_{00}$ and $\bar{h}_{01}$ according to $$\begin{bmatrix} \bar{h}_{00} \\ \bar{h}_{01} \end{bmatrix} = \frac{1}{2}\begin{bmatrix} S(r_{00}-r_{01}) \\ S(r_{00}+r_{01}) \end{bmatrix}.$$

8. A multi input multi output (MIMO) transceiver as recited in claim 7 wherein said channel estimation module further includes an inverse fast Fourier transform (IFFT) module being responsive to said frequency domain beamforming parameters and operative to generate time domain beamforming parameters $\bar{g}_{00}$ and $\bar{g}_{01}$.

9. A multi input multi output (MIMO) transceiver as recited in claim 8 wherein said adaptive beamforming parameters module further includes a multiplication module being responsive to said C matrix and operative to generate time domain adaptive beamforming parameters $\hat{g}_{00}$ and $\hat{g}_{01}$ according to $$\begin{bmatrix} \hat{g}_{00} \\ \hat{g}_{01} \end{bmatrix} = \begin{bmatrix} (T^*T)^{-1} & 0 \\ 0 & (T^*T)^{-1} \end{bmatrix}\begin{bmatrix} \bar{g}_{00} \\ \bar{g}_{01} \end{bmatrix}.$$

10. A multi input multi output (MIMO) transceiver as recited in claim 9 wherein said adaptive beamforming parameters module further includes a fast Fourier transform (FFT) module being responsive to said time domain adaptive beamforming parameters and operative to perform zero padding by increasing the length of said time domain adaptive beamforming parameters by adding zero values to generate a proper length vector.

11. A multi input multi output (MIMO) transceiver as recited in claim 10 wherein said fast Fourier transform (FFT) module is operative to process said proper length vector to generate frequency domain adaptive beamforming parameters $\hat{h}_{00}$ and $\hat{h}_{01}$ according to $$\begin{bmatrix} \hat{h}_{00} \\ \hat{h}_{01} \end{bmatrix}_{ls} = \begin{bmatrix} T & 0 \\ 0 & T \end{bmatrix}\begin{bmatrix} \hat{g}_{00} \\ \hat{g}_{01} \end{bmatrix}_{ls}.$$

12. A multi input multi output (MIMO) transceiver as recited in claim 11 further includes a fast Fourier transform (FFT) module coupled to said channel parameters module to receive said time domain adaptive beamforming parameters and operative to zero pad and process said time domain adaptive beamforming parameters to generate frequency domain adaptive beamforming parameters.

13. A multi input multi output (MIMO) transceiver as recited in claim 12 further includes a steering matrices module being responsive to said frequency domain adaptive beamforming parameters and operative to generate a steering matrix, said steering matrix being updated as said frequency domain adaptive beamforming parameters are updated.

14. A multi input multi output (MIMO) transceiver as recited in claim 13 wherein said steering matrices module is responsive to said modulated data stream [$s_1$, $s_2$] and operative to generate a beamformed data stream [$x_1$, $x_2$] according to $$\begin{bmatrix} x_1 \\ x_2 \end{bmatrix} = \begin{bmatrix} q_{11} & q_{12} \\ q_{21} & q_{22} \end{bmatrix}\begin{bmatrix} s_1 \\ s_2 \end{bmatrix}.$$

15. A multi input multi output (MIMO) transceiver as recited in claim 14 wherein said steering matrices module operative to combine said steering matrix with said beamformed data stream to generate output data.

16. A multi input multi output (MIMO) transceiver as recited in claim 1 wherein said encoding module further includes an encode/puncture module being responsive to said data packets and operative to generate encoded data, said encoding module including a bit interleaver coupled to receive said encoded data and operative to generate data samples, said encoding module including a modulator coupled to receive said data samples and operative to generate constellation points, said encoding module including a stream parser coupled to receive said constellation points and operative to generate said modulated data stream.

17. A multi input multi output (MIMO) transceiver as recited in claim 1 wherein said decoding module further includes an equalizer being responsive to said frequency domain adaptive beamforming parameters and operative to generate equalized samples, said decoding module including a deinterleaver coupled to receive said equalized samples and operative to generate deinterleaved data, said decoding module including a depuncturer coupled to receive said deinterleaved data and operative to generate depunctured data, said decoding module including a decoder coupled to receive said depunctured data and operative to generate said data bits.

18. A method for transmitting and receiving data comprising:
   generating time domain beamforming parameters;
   generating time domain adaptive beamforming parameters;
   generating frequency domain adaptive beamforming parameters;
   generating data bits;
   extracting the time domain adaptive beamforming parameters from the data bits;
   generating a window for estimating a channel state information (CSI) included in received samples, said received samples including a plurality of taps each of which having a tap energy, said window including one or more of said taps and a window tap energy, said window has an adaptable length to include a desired level of said window tap energy;
   centering said window being to open about the tap with the highest tap energy, said window being assigned a prescribed threshold, said received sample having one or more taps outside of said window and having tap energies below said threshold;
   generating a data packet;
   encoding the data packet to generate a modulated data stream;
   generating a beamformed data stream; and
   generating output signals and transmitting the output signals by forming beam patterns.

* * * * *